Patented Nov. 4, 1941

2,261,329

UNITED STATES PATENT OFFICE 2,261,329

PROCESS FOR OXIDIZING NITROSYL CHLORIDE

Herman A. Beekhuis, Jr., Petersburg, Va., assignor to The Solvay Process Company, New York, N. Y., a corporation of New York No Drawing. Application April 20, 1938,
Serial No. 203,201

11 Claims. (Cl. 23—157)

This invention relates to a process for the oxidation of nitrosyl chloride by means of gaseous oxygen. More particularly, this invention relates to a process for the treatment of a gas mixture of nitrosyl chloride and chlorine involving oxidation of the nitrosyl chloride to nitrogen peroxide ($NO_2$) and chlorine after freeing the gas of chlorine.

It is known that by the reaction of nitric acid with a chloride such as hydrogen chloride or a chloride of a metal such as sodium, potassium or calcium chloride, and by other chemical reactions, mixtures of nitrosyl chloride and chlorine are formed. In processes for producing such mixtures, it is frequently desirable to decompose the nitrosyl chloride in order to obtain in the form of two separate compounds the fixed nitrogen and chlorine of the nitrosyl chloride as a preliminary step in the separate recovery of the chlorine and the fixed nitrogen.

It has been proposed to treat a mixture of nitrosyl chloride and chlorine gas obtained by the reaction of nitric and hydrochloric acids first to separate the nitrosyl chloride from the chlorine and then to pass the nitrosyl chloride in contact with water or dilute nitric acid together with oxygen or air. It was said the nitrosyl chloride may thus be decomposed with the formation of nitric acid and chlorine. Instead of reacting the nitrosyl chloride with water and oxygen, as in such a procedure, it has also been proposed to heat a gaseous mixture of nitrosyl chloride and chlorine to a high temperature and then quickly cool it to a low temperature while mixing the gases being cooled with air. By such a procedure the nitrosyl chloride is decomposed and the product of the process is a gaseous mixture of nitrogen peroxide and chlorine. The process of this invention, as distinguished from such prior processes, relates to the oxidation of gaseous nitrosyl chloride by means of gaseous oxygen by heating to an elevated temperature a gas containing nitrosyl chloride and oxygen and thereby forming a gaseous mixture of nitrogen peroxide and chlorine.

I have discovered that when a gaseous mixture of nitrosyl chloride and chlorine is to be treated to oxidize the nitrosyl chloride by means of gaseous oxygen, either pure oxygen or air, the rate of reaction of the nitrosyl chloride and oxygen gas may be greatly increased if before heating the gas to oxidize the nitrosyl chloride the gas is first substantially freed from chlorine.

I have discovered that when a gas containing nitrosyl chloride and chlorine is heated at temperatures up to 400° C., nitrogen peroxide (also called nitrogen tetroxide) and chlorine are formed but the oxygen does not react directly with the nitrosyl chloride. The reaction takes place in two stages. Nitrosyl chloride is decomposed to nitric oxide and chlorine and the oxygen reacts with the nitric oxide forming nitrogen peroxide. These individual reactions and the overall reaction may be represented by the following equations:

I. $2NOCl = 2NO + Cl_2$
II. $2NO + O_2 = 2NO_2$
III. $2NOCl + O_2 = Cl_2 + 2NO_2$

I have further discovered that the presence of chlorine in the gas containing nitrosyl chloride which is to be oxidized materially decreases the rate of reaction between the nitrosyl chloride and oxygen at temperatures in the range of 100° C. to 400° C. throughout the progress of the reaction and even while the reacting gases are far from equilibrium conditions with respect to the proportions of reactants and products which are present. Chlorine thus deleteriously affects the rate at which the overall reaction progresses whether it be carried out merely by heating the reactants or by both heating and contacting them with a catalyst promoting the reaction. Below 100° C. I have found that the rate with which nitrosyl chloride and oxygen react is extremely slow, so slow in fact that, for example, by mixing oxygen and nitrosyl chloride at ordinary atmospheric temperatures there is no perceptible reaction between the gases even after long periods of time. Accordingly, at temperatures below 100° C. the presence or absence of chlorine has no practical effect upon the progress of the reaction. When heated to 100° C. or higher nitrosyl chloride and oxygen react to form nitrogen peroxide and chlorine. On the other hand, at temperatures above 400° C., the reaction appears to lose its susceptibility to the influence of the presence of chlorine in the initial gas mixture which is heated to promote the reaction.

The following data is illustrative of the influence of chlorine initially in a mixture of nitrosyl chloride and oxygen upon the oxidation of the nitrosyl chloride at temperatures within the range of 100° to 400° C.:

*Temperature 150° C.*

|  | I | Ia | Ib |
|---|---|---|---|
| Pressure NOCl, atm | 1 | 1 | 0.6 |
| Pressure Cl₂, atm | 0 | 1 | 0.6 |
| Pressure O₂, atm | 0.5 | 0.5 | 0.3 |
| Total pressure, atm | 1.5 | 2.5 | 1.5 |
| Relative rate of oxidation: |  |  |  |
| Initial | 1 | 0.065 | 0.023 |
| 50% of NOCl oxidized | 0.028 | 0.0075 | 0.0027 |

*Temperature 250° C.*

|  | II | IIa | IIb | III | IIIa | IIIb |
|---|---|---|---|---|---|---|
| Pressure NOCl, atm | 1 | 1 | 0.6 | 4 | 4 | 2.4 |
| Pressure Cl₂, atm | 0 | 1 | 0.6 | 0 | 4 | 2.4 |
| Pressure O₂, atm | 0.5 | 0.5 | 0.3 | 2 | 2 | 1.2 |
| Total pressure, atm | 1.5 | 2.5 | 1.5 | 6 | 10 | 6 |
| Relative rate of oxidation: |  |  |  |  |  |  |
| Initial | 1 | 0.25 | 0.08 | 1 | 0.16 | 0.055 |
| 50% of NOCl oxidized | 0.086 | 0.031 | 0.01 | 0.064 | 0.019 | 0.006 |

The above data is for comparative processes in which gaseous mixtures of nitrosyl chloride and oxygen, with and without chlorine, are heated in a reaction chamber not containing a catalyst to the respective temperatures of 150° C. and 250° C. The pressure of nitrosyl chloride, chlorine and oxygen in the initial gas mixture is given in atmospheres and the total pressure of the gases represents the pressure under which they were heated. The relative rates of oxidation of the nitrosyl chloride are given both for the initial rate, i. e. immediately upon introducing the gaseous mixtures into the reaction chamber, and also the rate at which the reaction was progressing when 50% of the inlet nitrosyl chloride had been oxidized. The rates of oxidation are expressed in relative terms, taking as unity the initial rate for comparable gas mixtures of nitrosyl chloride and oxygen containing no chlorine.

The data for the process carried out at 150° C. shows that in heating under a pressure of 1.5 atmospheres a gas containing 1 volume of nitrosyl chloride to ½ volume of oxygen, the initial rate of oxidation of the nitrosyl chloride is decreased from 1 for the gas free from chlorine to 0.023 for the gas containing 1 volume of chlorine for every 1 volume of nitrosyl chloride (shown by the data in column I as compared with the data in column Ib). With the same gas mixture of nitrosyl chloride, chlorine and oxygen heated to 150° C. under a pressure of 2.5 atmospheres, the initial rate of oxidation of the nitrosyl chloride was decreased to 0.065 by the presence of the chlorine (comparing the data in columns I and Ia), despite a favorable effect upon the reaction of increasing the pressure under which the gases were heated. In these procedures when 50% of the nitrosyl chloride had been oxidized, the rate of oxidation in a gas initially free from chlorine had decreased from 1 to 0.028, whereas when the chlorine was initially present in the gas the rate of oxidation at this stage had decreased from 1 to 0.0027 and to 0.0075, respectively, at pressures of 1.5 and 2.5 atmospheres.

Columns II, IIa and IIb similarly show the effect upon the oxidation of the nitrosyl chloride carried out at 250° C. and under total pressures of 1.5 and 2.5 atmospheres. The effect of chlorine in the initial gas mixture on the oxidation of nitrosyl chloride at pressures of 6 and 10 atmospheres is shown by the data in columns III, IIIa and IIIb.

Based on my discovery of the effect of chlorine upon the oxidation of nitrosyl chloride by means of oxygen, my invention comprises carrying out the oxidation reaction at temperatures of about 200° C. or higher but not above 400° C., and heating to such temperatures a gas mixture of nitrosyl chloride and oxygen which is substantially free from chlorine. As applied to the treatment of a mixture of nitrosyl chloride and chlorine, such as is obtained from the reaction of nitric acid and a chloride, my invention comprises a process involving the following steps: first separating the nitrosyl chloride from the chlorine, and then heating the nitrosyl chloride as a gas substantially free from chlorine but mixed with oxygen to a temperature of about 200° C. or higher but not above 400° C., thereby oxidizing the nitrosyl chloride and obtaining a gaseous product containing nitrogen peroxide and chlorine. Temperatures below 200° C. down to 100° C. may be employed for oxidizing nitrosyl chloride by the process of this invention, although the use of these lower temperatures is usually not desirable because of the low rate of reaction. However, particularly by using active catalysts and high pressures to promote the reaction, substantial quantities of the nitrosyl chloride may be oxidized at these temperatures.

A particular advantage which may be obtained by operating in accordance with this invention is that the process of oxidizing nitrosyl chloride when carried out in the manner herein described may be made thermally self-supporting by using the heat in the hot reaction products to supply the heat required for bringing the incoming nitrosyl chloride and oxygen mixture to the requisite temperatures for the oxidation reaction.

The gas treated to oxidize nitrosyl chloride in accordance with this invention may be dry or may contain water vapor. When the nitrogen peroxide and chlorine formed by oxidation of the nitrosyl chloride are to be separated by liquefaction and fractional distillation, it is preferred to start with dry nitrosyl chloride and oxygen gases, oxidize the nitrosyl chloride by the process herein described and then condense the gases and fractionate the liquid condensate. By thus operating not only will the difficulties presented by the liquefaction of moist gases be avoided, but the absence of moisture from the gases in which the nitrosyl chloride is oxidized will decrease their corrosiveness towards materials of which the apparatus in which they are treated may be constructed. Also, when catalysts are used to promote the oxidation reaction, the absence of substantial amounts of moisture from the gases may improve the catalyst performance.

The following example is illustrative of this invention:

A gas mixture containing nitrosyl chloride and chlorine in about equal molecular proportions is produced by the reaction of aqueous nitric acid and sodium chloride which may be expressed by the following equation:

IV.  $4HNO_3 + 3NaCl = 3NaNO_3 + NOCl + Cl_2 + 2H_2O$

The moist gas containing nitrosyl chloride and chlorine thus produced, is passed through a cooling coil in which the gas is cooled to a temperature of about −10° C. to condense the water vapor and remove any nitric acid and nitrogen oxides which may be present in the gas. The thus dried gas is then further cooled to a temperature of about −25° C. to liquefy both the nitrosyl chloride and the chlorine. The condensate thus obtained is distilled to separate the nitrosyl chloride from the chlorine.

The dry nitrosyl chloride gas thus obtained is mixed with sufficient dry oxygen to oxidize the nitrosyl chloride in accordance with the reaction $$2NOCl + O_2 = 2NO_2 + Cl_2$$

A relatively pure oxygen gas is preferably employed in order to avoid dilution of the nitrosyl chloride with inert gas. The resulting dry mixture of nitrosyl chloride and oxygen is passed through a heat exchanger in which the mixture is heated to a temperature at which the reaction of the nitrosyl chloride and oxygen is initiated, for example, to a temperature of about 200° C. and is then introduced into an oxidizing chamber in which the nitrosyl chloride and oxygen react to form nitrogen peroxide and chlorine. The oxidation products leaving the oxidation chamber are passed through the heat exchanger in indirect heat exchange with the nitrosyl chloride and oxygen gas on its way to the oxidation chamber to preheat it to the above temperature. The oxidizing chamber is of a sufficient size so that the gases remain in the chamber at least until more than two-thirds and preferably substantially all of the nitrogen oxides formed as a result of the reaction of the nitrosyl chloride are in the state of oxidation corresponding to nitrogen peroxide ($NO_2$).

With the foregoing conditions of operation and with the gases being maintained under a pressure materially above atmospheric, for example 7 atmospheres or above, the oxidation reaction is self-supporting in so far as the heat requirements are concerned; that is, the heat evolved as a result of the reaction between the nitrosyl chloride and oxygen is sufficient to preheat the incoming gases to the desired temperature at which the reaction is initiated and the gases in the oxidizing chamber attain during their reaction a temperature which is not higher than about 350° to 400° C. and is preferably about 300° C. At these temperatures, substantially all of the nitrogen oxides in the gas leaving the heat exchanger may be in the form of nitrogen peroxide. By employing pressure in the oxidation of the nitrosyl chloride this step may be operated without requiring a continuous supply of heat from an extraneous source and without the use of a catalyst to catalyze the reaction. While it is preferred to conduct the oxidation of the nitrosyl chloride under a pressure of about 8 atmospheres or higher, this oxidation reaction may be carried out at atmospheric pressure and may be thermally self-sustaining but, under such conditions, the oxidation chamber should contain a catalyst promoting the reaction to form nitrogen peroxide and chlorine and the gases passed over this catalyst. This may be an alumina catalyst such as is described in my copending application Serial No. 697,241, filed November 9, 1933, or preferably is the zeolite which occurs naturally as the mineral chabazite, described in the copending application of William C. Klingelhoefer, Serial No. 125,139, filed February 10, 1937.

If desired, instead of employing a concentrated oxygen gas for the oxidation of the nitrosyl chloride, a diluted gas such as air may be employed. The advantage in using concentrated oxygen with respect to maintaining the reaction thermally self-supporting decreases as the pressure under which the reaction gases are maintained is increased, and under a sufficiently high pressure the reaction becomes self-sustaining even when the required oxygen is introduced as air or the nitrosyl chloride is not first separated from the chlorine.

The gas mixture of nitrogen peroxide and chlorine, which may contain residual unoxidized nitrosyl chloride, may be employed for preheating by indirect heat exchange the incoming nitrosyl chloride-oxygen gas prior to its catalysis, and then be treated in any desired manner to separately recover the chlorine and the nitrogen peroxide. For example, the gas may be cooled to liquefy the chlorine, nitrogen peroxide and unoxidized nitrosyl chloride. The liquid mixture thus obtained is fractionally distilled to vaporize the chlorine and nitrosyl chloride therefrom and thus separate them from the nitrogen peroxide.

In carrying out the process of this invention air may be mixed with the nitrosyl chloride gas to supply the oxygen for the oxidation of the nitrosyl chloride instead of the relatively pure oxygen gas used in the above example. In employing air the gases heated to oxidize the nitrosyl chloride will, of course, be diluted with the nitrogen contained in the air. Although the dilution of the reacting gases by means of nitrogen will slow up somewhat the rate of oxidation of the nitrosyl chloride, the nitrogen merely acts as a diluent and its effect is not comparable to that of chlorine when this is initially present in the gas containing nitrosyl chloride and oxygen.

The process of this invention is applicable to the treatment of any mixture of nitrosyl chloride with substantial proportions of chlorine, for example mixtures containing more than 0.1 mol of chlorine per mol of nitrosyl chloride. It is particularly effective, however, for the treatment of mixtures containing about equal molecular proportions of nitrosyl chloride and chlorine, since the inimical effect of chlorine upon the oxidation of the nitrosyl chloride increases with an increase in molecular ratio of chlorine to nitrosyl chloride in the initial gas mixture which is heated to oxidize the nitrosyl chloride. Such mixtures are obtained from the reaction of nitric acid and a chloride.

In carrying out the process of this invention, the nitrosyl chloride will usually be mixed with sufficient oxygen for the oxidation of the nitrosyl chloride in accordance with the reaction of Equation III above, and an excess of oxygen over this amount aids in obtaining a high degree of oxidation. However, the invention is not limited to processes in which the oxygen is used in these amounts, but is applicable to a procedure in which the oxygen is present in an amount insufficient to react with all of the nitrosyl chloride.

In this specification and the appended claims reference is made to the oxidation of nitrosyl chloride to nitrogen peroxide and chlorine. As is well understood, a gas containing nitrogen peroxide and oxygen will also contain a varying portion of the lower oxide of nitrogen, nitrogen trioxide ($N_2O_3$), depending upon the temperature, pressure, ratio of oxygen to nitrogen oxides, etc. Accordingly, in referring to nitrogen peroxide it is to be understood that reference is made to mixtures of $NO_2$ with varying proportions of $N_2O_3$.

This application is a continuation-in-part of my copending application Serial No. 696,138, filed November 1, 1933, now Patent 2,130,519, issued September 20, 1938.

I claim:

1. The process for the treatment of a mixture of nitrosyl chloride and chlorine which comprises separating the nitrosyl chloride from the chlorine contained in said mixture, mixing the separated nitrosyl chloride with gaseous oxygen to form a gas mixture of nitrosyl chloride and oxygen and heating said gas mixture to a temperature of about 200° C. or higher but not above 400° C. to oxidize the nitrosyl chloride to gaseous nitrogen peroxide and chlorine.

2. The process for the treatment of a gas containing nitrosyl chloride and chlorine to recover chlorine both free and combined as nitrosyl chloride, separate from nitrogen combined as nitrosyl chloride in said gas which comprises cooling the gas to condense therefrom a liquid mixture of nitrosyl chloride and chlorine, separately recovering from said liquid mixture the chlorine and nitrosyl chloride contained therein, mixing said nitrosyl chloride as a gas substantially free from said chlorine with gaseous oxygen, and heating the resulting gaseous mixture to a temperature of about 200° C. or higher but not above 400° C. to oxidize the nitrosyl chloride to gaseous nitrogen peroxide and chlorine.

3. The process for the treatment of a mixture of nitrosyl chloride and chlorine which comprises separating the nitrosyl chloride from the chlorine contained in said mixture, forming a gas mixture of the separated nitrosyl chloride with oxygen and effecting oxidation of the nitrosyl chloride to gaseous nitrogen peroxide and chlorine at a temperature of 100° C. to 400° C.

4. The process for the treatment of a mixture of about equal molecular proportions of nitrosyl chloride and chlorine such as is produced by the reaction of nitric acid and a chloride which comprises separating the nitrosyl chloride from the chlorine contained in said mixture, forming a gas mixture of the separated nitrosyl chloride with oxygen and effecting oxidation of the nitrosyl chloride to gaseous nitrogen peroxide and chlorine at a temperature of 100° C. to 400° C.

5. The process for the treatment of a gas containing nitrosyl chloride and chlorine to recover chlorine both free and combined as nitrosyl chloride, separate from nitrogen combined as nitrosyl chloride in said gas which comprises cooling the gas to condense therefrom a liquid mixture of nitrosyl chloride and chlorine, separately recovering from said liquid mixture the chlorine and nitrosyl chloride contained therein, mixing said nitrosyl chloride as a gas substantially free from said chlorine with gaseous oxygen, heating the resulting gaseous mixture to a temperature of 100° C. to 400° C. to oxidize the nitrosyl chloride to gaseous nitrogen peroxide and chlorine and recovering from the resulting mixture of gases chlorine separate from the nitrogen peroxide.

6. In the oxidation of nitrosyl chloride by reaction with gaseous oxygen, that improvement which comprises preparing a gaseous mixture of said nitrosyl chloride and oxygen which is substantially free from chlorine and oxidizing the nitrosyl chloride of said mixture to gaseous nitrogen peroxide and chlorine at a temperature of 100° C. to 400° C.

7. In a process for the oxidation of nitrosyl chloride, the improvement which comprises preheating a gas containing nitrosyl chloride and oxygen, introducing the preheated gas into a reaction chamber, withdrawing the resulting gaseous products from the reaction chamber and passing them in heat exchange with the first mentioned gas on its way to said reaction chamber, and in the aforesaid steps preheating said gas containing nitrosyl chloride and oxygen to a temperature at which reaction of the nitrosyl chloride and oxygen is initiated and in the course of the ensuing reaction a temperature of the reactants is attained at which about two-thirds or more of the nitrogen oxides formed as a result of the reaction are present as nitrogen peroxide and maintaining the gases in which said nitrosyl chloride and oxygen are undergoing reaction under a pressure at which the reaction is thermally self-supporting by transfer of heat evolved by the reaction to the gas on its way to said reaction chamber from the gaseous products leaving the reaction chamber.

8. In a process for the oxidation of nitrosyl chloride the improvement which comprises heating a reaction mixture of nitrosyl chloride and oxygen to a temperature of about 200° C. at which reaction of said nitrosyl chloride and oxygen is initiated, and then maintaining the mixture of gases at a temperature not higher than about 350° C. to 400° C. and under a pressure at which the reaction of the nitrosyl chloride and oxygen is thermally self-supporting.

9. A process for the oxidation of nitrosyl chloride, which comprises preheating a mixture of nitrosyl chloride and oxygen to a temperature of about 200° C. at which reaction of the nitrosyl chloride is initiated, introducing the thus preheated mixture of nitrosyl chloride and oxygen into a reaction chamber and maintaining the reacting gases at a temperature at which about two-thirds or more of the nitrogen oxides formed as a result of the reaction are present as nitrogen peroxide, withdrawing the resulting gaseous products from the reaction chamber and passing them in heat exchange with the aforesaid mixture of nitrosyl chloride and oxygen on its way to said reaction chamber to preheat the mixture to said temperature of about 200° C., and maintaining the aforesaid reacting gases in said reaction chamber under a pressure materially above atmospheric at which the reaction of the nitrosyl chloride and oxygen is thermally self-supporting by transfer of heat evolved by the reaction to the mixture of nitrosyl chloride and oxygen on its way to said reaction chamber from the gaseous products leaving the reaction chamber.

10. The process for the oxidation of nitrosyl chloride which comprises heating a gaseous mixture of nitrosyl chloride and oxygen under a pressure of about 8 atmospheres or higher to a temperature of about 200° C., passing the heated gases through a reaction chamber in which they are retained until about two-thirds or more of the nitrogen oxides formed by reaction of the nitrosyl chloride are in a state of oxidation corresponding to $NO_2$, passing the hot products of the reaction at the elevated temperature to which they are heated by the heat liberated by the reaction in heat exchange with a cooler mixture of nitrosyl chloride and oxygen to heat the mixture to about 200° C.

11. The process for the oxidation of nitrosyl chloride, which comprises heating a mixture of nitrosyl chloride and oxygen to a temperature of about 200° C. at which reaction of the nitrosyl chloride and oxygen is initiated while maintaining the reaction gases under a pressure of 7 atmospheres or above, and maintaining the reacting gases at a temperature at which about two-thirds or more of the nitrogen oxides formed as a result of the reaction are present as nitrogen peroxide.

HERMAN A. BEEKHUIS, Jr.